US012619251B2

(12) United States Patent
Cai et al.

(10) Patent No.: US 12,619,251 B2
(45) Date of Patent: May 5, 2026

(54) MARKER ALLOCATION METHOD AND APPARATUS IN UNMANNED AERIAL VEHICLE AIRPORT AND UNMANNED AERIAL VEHICLE LANDING METHOD AND APPARATUS

(71) Applicant: Beijing Sankuai Online Technology Co., Ltd., Beijing (CN)

(72) Inventors: Jiancheng Cai, Beijing (CN); Xinmin Liu, Beijing (CN); Yinian Mao, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 179 days.

(21) Appl. No.: 18/573,443

(22) PCT Filed: Jan. 6, 2023

(86) PCT No.: PCT/CN2023/070802
§ 371 (c)(1),
(2) Date: Dec. 22, 2023

(87) PCT Pub. No.: WO2023/134551
PCT Pub. Date: Jul. 20, 2023

(65) Prior Publication Data
US 2024/0281000 A1     Aug. 22, 2024

(30) Foreign Application Priority Data

Jan. 11, 2022    (CN) ......................... 202210028026.1

(51) Int. Cl.
*G05D 1/244*        (2024.01)
*G05D 1/654*        (2024.01)
(Continued)

(52) U.S. Cl.
CPC ............. *G05D 1/244* (2024.01); *G05D 1/654* (2024.01); *G06V 20/17* (2022.01); *G05D 2109/20* (2024.01); *G05D 2111/10* (2024.01)

(58) Field of Classification Search
CPC ...... G06V 20/17; G05D 2111/10; G08G 5/54; G08G 5/55; G08G 5/57; B64U 70/90;
(Continued)

(56) References Cited

U.S. PATENT DOCUMENTS

| 9,284,062 B2 | 3/2016 | Wang |
| 9,550,582 B2 | 1/2017 | Wang |

(Continued)

FOREIGN PATENT DOCUMENTS

| CN | 105763230 A | 7/2016 |
| CN | 106081146 A | 11/2016 |

(Continued)

OTHER PUBLICATIONS

Translation of CN_106127201_A (Year: 2016).*

(Continued)

*Primary Examiner* — Scott A Browne
*Assistant Examiner* — Jisun Choi
(74) *Attorney, Agent, or Firm* — Kilpatrick Townsend & Stockton LLP

(57) ABSTRACT

Disclosed is a marker allocation method. According to an airport shape and an airport size of an unmanned aerial vehicle airport and a standard shape and a standard size of a takeoff and landing point, a target layout of an unmanned aerial vehicle airport that includes takeoff and landing points is determined. Further, an initial takeoff and landing point is determined from the takeoff and landing points included in the target layout. Markers respectively allocated to the takeoff and landing points are determined from a predetermined marker set that includes markers of different image (Continued)

S100

Determine a target layout of an unmanned aerial vehicle airport according to an airport shape and an airport size of the unmanned aerial vehicle airport and a predetermined standard shape and a predetermined standard size of a takeoff and landing point, where the target layout includes multiple takeoff and landing points

S102

Determine an initial takeoff and landing point from the multiple takeoff and landing points included in the target layout

S104

Determine markers respectively allocated to the multiple takeoff and landing points from a predetermined marker set by using the initial takeoff and landing point as a start point, according to a predetermined search algorithm, and by using a constraint that similarity between a marker of any one of the multiple takeoff and landing points and markers of other takeoff and landing points in a specified neighborhood thereof is the lowest, where image content of each marker in the marker set is different content, by using the initial takeoff and landing point as a start point, according to a predetermined search algorithm, and with a constraint that similarity between a marker of any one of the multiple takeoff and landing points and markers of other takeoff and landing points in a specified neighborhood thereof is the lowest.

6 Claims, 4 Drawing Sheets

(51) Int. Cl.
*G05D 109/20* (2024.01)
*G05D 111/10* (2024.01)
*G06V 20/17* (2022.01)

(58) Field of Classification Search
CPC .... B64U 70/95; B64U 70/97; B64U 2101/30; B64F 1/18; G06K 19/06056
See application file for complete search history.

(56) References Cited

U.S. PATENT DOCUMENTS

| | | | |
|---|---|---|---|
| 11,091,043 | B2 | 8/2021 | Wang |
| 2016/0039542 | A1 | 2/2016 | Wang |
| 2016/0167807 | A1 | 6/2016 | Wang |
| 2017/0088288 | A1 | 3/2017 | Wang |
| 2017/0259912 | A1 * | 9/2017 | Michini .............. G05D 1/0011 |
| 2019/0227572 | A1 | 7/2019 | Blonder et al. |
| 2020/0301445 | A1 | 9/2020 | Jourdan et al. |

FOREIGN PATENT DOCUMENTS

| | | | | | |
|---|---|---|---|---|---|
| CN | 106127201 | A | * | 11/2016 | ............. G05D 1/101 |
| CN | 106527487 | A | | 3/2017 | |
| CN | 106573684 | A | | 4/2017 | |
| CN | 107444665 | A | | 12/2017 | |
| CN | 106127201 | B | | 2/2019 | |
| CN | 109866938 | A | | 6/2019 | |
| CN | 110641715 | A | | 1/2020 | |
| CN | 111137463 | A | | 5/2020 | |
| CN | 111382971 | A | | 7/2020 | |
| CN | 113655804 | A | | 11/2021 | |
| CN | 113655806 | A | | 11/2021 | |
| CN | 113759940 | A | | 12/2021 | |
| KR | 102270715 | B1 | | 6/2021 | |
| KR | 20220161671 | A | * | 12/2022 | ........... B64C 39/024 |

OTHER PUBLICATIONS

Translation of KR 20220161671 A (Year: 2022).*
European Patent Office, Extended European Search Report Issued in Application No. 23739895.3, Oct. 18, 2024, Germany, 13 pages.
Australian Patent Office, Office Action Issued in Application No. 2023207182, Nov. 6, 2024, 3 pages.
State Intellectual Property Office of the People's Republic of China, Office Action and Search Report Issued in Application No. 202210028026.1, Apr. 23, 2025, 15 pages.
ISA State Intellectual Property Office of the People's Republic of China, International Search Report Issued in Application No. PCT/CN2023/070802, Apr. 13, 2023, WIPO, 4 pages.
ISA State Intellectual Property Office of the People's Republic of China, Written Opinion of the International Searching Authority Issued in Application No. PCT/CN2023/070802, Apr. 13, 2023, WIPO, 3 pages.

* cited by examiner

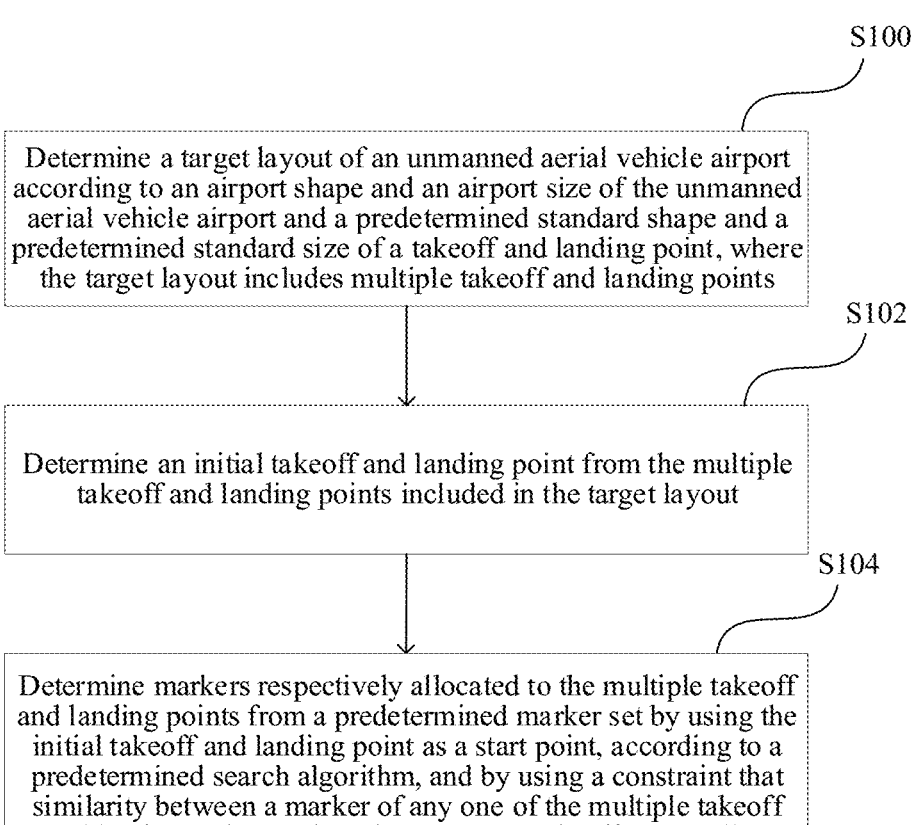

S100

Determine a target layout of an unmanned aerial vehicle airport according to an airport shape and an airport size of the unmanned aerial vehicle airport and a predetermined standard shape and a predetermined standard size of a takeoff and landing point, where the target layout includes multiple takeoff and landing points

S102

Determine an initial takeoff and landing point from the multiple takeoff and landing points included in the target layout

S104

Determine markers respectively allocated to the multiple takeoff and landing points from a predetermined marker set by using the initial takeoff and landing point as a start point, according to a predetermined search algorithm, and by using a constraint that similarity between a marker of any one of the multiple takeoff and landing points and markers of other takeoff and landing points in a specified neighborhood thereof is the lowest, where image content of each marker in the marker set is different

FIG. 1

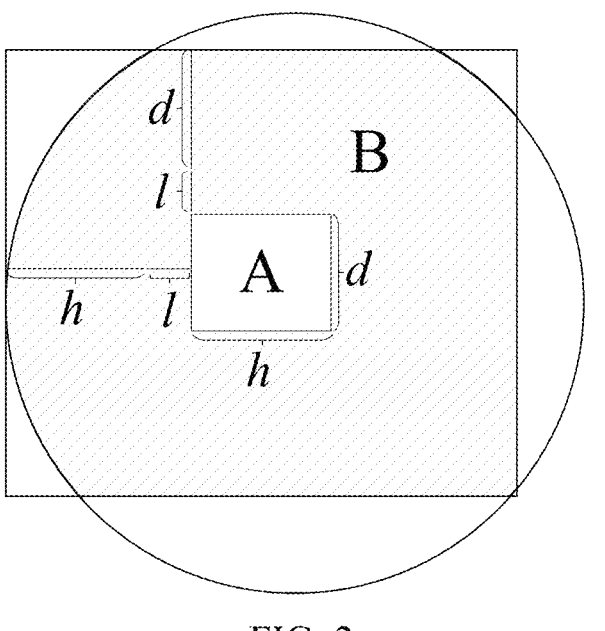

FIG. 2

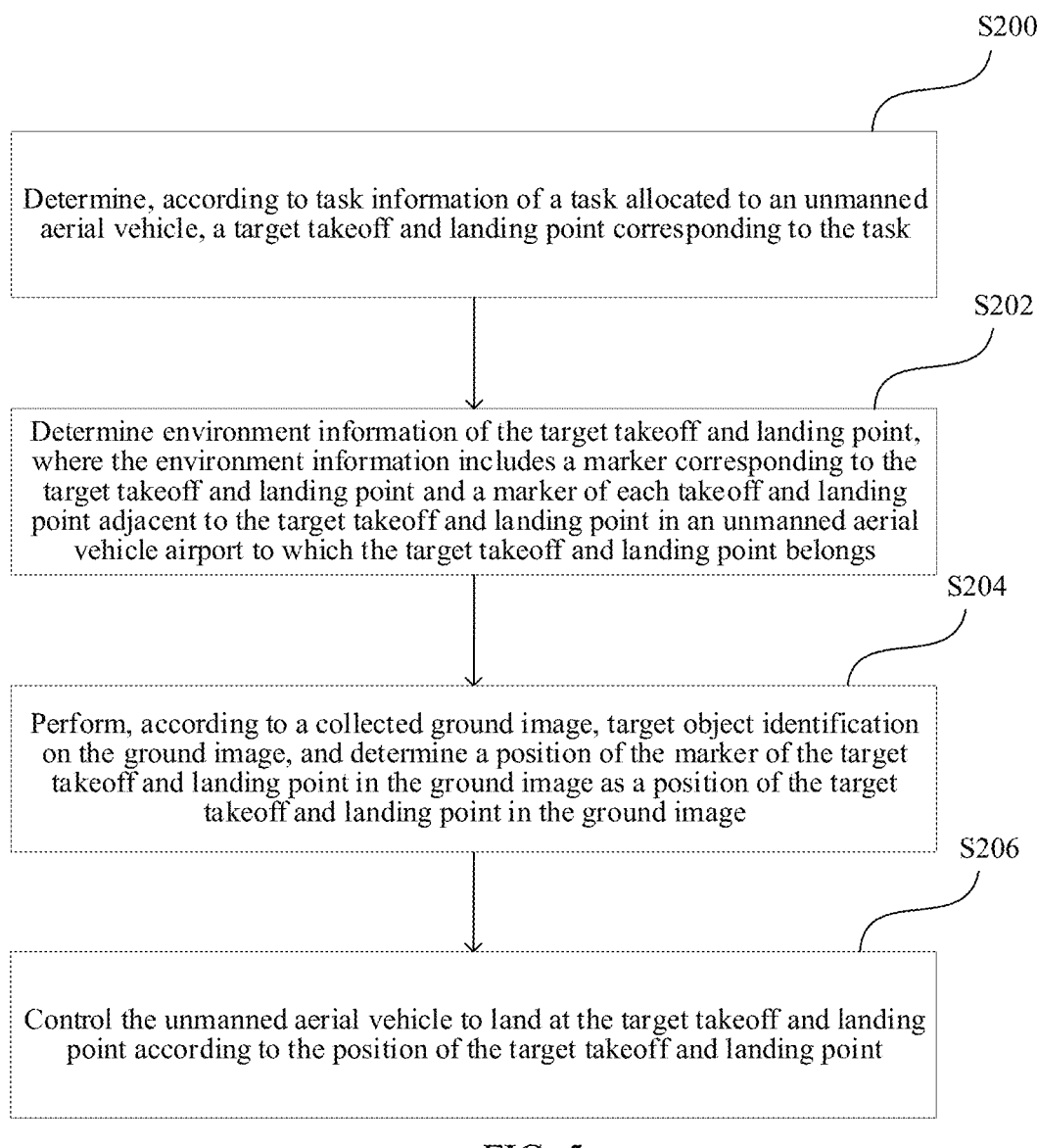

S200

Determine, according to task information of a task allocated to an unmanned aerial vehicle, a target takeoff and landing point corresponding to the task

S202

Determine environment information of the target takeoff and landing point, where the environment information includes a marker corresponding to the target takeoff and landing point and a marker of each takeoff and landing point adjacent to the target takeoff and landing point in an unmanned aerial vehicle airport to which the target takeoff and landing point belongs

S204

Perform, according to a collected ground image, target object identification on the ground image, and determine a position of the marker of the target takeoff and landing point in the ground image as a position of the target takeoff and landing point in the ground image

S206

Control the unmanned aerial vehicle to land at the target takeoff and landing point according to the position of the target takeoff and landing point

| First determining module | Second determining module | Allocation module |

FIG. 6

MARKER ALLOCATION METHOD AND APPARATUS IN UNMANNED AERIAL VEHICLE AIRPORT AND UNMANNED AERIAL VEHICLE LANDING METHOD AND APPARATUS

CROSS-REFERENCE TO RELATED APPLICATIONS

This application is a national stage of international PCT Application No. PCT/CN2023/070802, filed on Jan. 6, 2023, the entire contents of which are incorporated herein by reference.

TECHNICAL FIELD

This specification relates to the field of computer technologies, and in particular, to a marker allocation method and apparatus in an unmanned aerial vehicle airport and an unmanned aerial vehicle landing method and apparatus.

BACKGROUND

Currently, with advances in technologies and maturity of unmanned driving technologies, an unmanned driving device has successfully met application in the delivery field, and is often applied to scenarios such as take-out and express delivery. In a process of executing a task, an unmanned aerial vehicle usually needs to be controlled to land accurately, so as to ensure safety of the unmanned aerial vehicle.

In a related technology, a vision-guided manner is generally used to implement landing of an unmanned aerial vehicle. Specifically, an identifier, such as a marker, used to cause an unmanned aerial vehicle to land may be predetermined in an unmanned aerial vehicle airport. When the unmanned aerial vehicle needs to land, a ground image can be collected first. Then, the unmanned aerial vehicle may perform target identification on the collected ground image, and determine a position of a marker in the image as a position of an unmanned aerial vehicle airport in the image. Finally, the unmanned aerial vehicle is controlled to land in the unmanned aerial vehicle airport according to the position of the unmanned aerial vehicle airport in the image.

However, in the related technology, positions of markers in the unmanned aerial vehicle airport are generally determined by means of manual planning, but the long time and high costs of manual planning makes it less efficient to assign markers to takeoff and landing points within the unmanned aerial vehicle airport in the related technology.

SUMMARY

This specification provides a marker allocation method and apparatus in an unmanned aerial vehicle airport and an unmanned aerial vehicle landing method and apparatus.

This specification provides a marker allocation method in an unmanned aerial vehicle airport, including:

determining a target layout of an unmanned aerial vehicle airport according to an airport shape and an airport size of the unmanned aerial vehicle airport and a predetermined standard shape and a predetermined standard size of a takeoff and landing point, where the target layout includes multiple takeoff and landing points;

determining an initial takeoff and landing point from the multiple takeoff and landing points included in the target layout; and determining markers respectively allocated to the multiple takeoff and landing points from a predetermined marker set by using the initial takeoff and landing point as a start point, according to a predetermined search algorithm, and by using a constraint that similarity between a marker of any one of the multiple takeoff and landing points and markers of other takeoff and landing points in a specified neighborhood thereof is the lowest, where image content of each marker in the marker set is different.

Optionally, the determining a target layout of an unmanned aerial vehicle airport according to an airport shape and an airport size of the unmanned aerial vehicle airport and a predetermined standard shape and a predetermined standard size of a takeoff and landing point includes:

determining multiple takeoff and landing point layouts of the unmanned aerial vehicle airport according to the airport shape and the airport size of the unmanned aerial vehicle airport and the predetermined standard shape and the predetermined standard size of the takeoff and landing point; and determining the target layout of the unmanned aerial vehicle airport from the multiple takeoff and landing point layouts according to a quantity of takeoff and landing points included in the multiple takeoff and landing point layouts.

Optionally, the determining multiple takeoff and landing point layouts of the unmanned aerial vehicle airport according to the airport shape and the airport size of the unmanned aerial vehicle airport and the predetermined standard shape and the predetermined standard size of the takeoff and landing point includes:

randomly determining a takeoff and landing point as a start point within a range of the unmanned aerial vehicle airport according to the airport shape and the airport size of the unmanned aerial vehicle airport: determining, along a normal direction of any boundary of the start point according to the predetermined standard shape and the predetermined standard size of the takeoff and landing point, a takeoff and landing point that is at a predetermined spacing from the start point in the range of the unmanned aerial vehicle airport, re-using the determined takeoff and landing point as a new start point, continuing to determine another takeoff and landing point in another region different from the determined takeoff and landing point in the range of the unmanned aerial vehicle airport until a takeoff and landing point cannot be determined, and determining a takeoff and landing point layout:

determining whether a quantity of generated takeoff and landing point layouts is less than a predetermined quantity threshold; and if the quantity of generated takeoff and landing point layouts is less than the predetermined quantity threshold, randomly re-determining a takeoff and landing point in the range of the unmanned aerial vehicle airport, and continuing to determine a takeoff and landing point layout until a quantity of determined takeoff and landing point layouts reaches the quantity threshold: or if the quantity of generated takeoff and landing point layouts is greater than or equal to the predetermined quantity threshold, skipping continuing to determine a takeoff and landing point layout.

Optionally, the determining, along a normal direction of any boundary of the start point according to the predetermined standard shape and the predetermined standard size of the takeoff and landing point, a takeoff and landing point that is at a predetermined spacing from the start point in the range of the unmanned aerial vehicle airport, re-using the determined takeoff and landing point as a new start point, continuing to determine another takeoff and landing point in another region different from the determined takeoff and landing point in the range of the unmanned aerial vehicle airport includes: determining, along a normal direction of any boundary of the start point, whether a region that is at the predetermined spacing from the start point and that is distant from other determined takeoff and landing points by not less than the predetermined spacing exists in the range of the airport; and if the region exists, determining the region as a new takeoff and landing point, updating the new takeoff and landing point as a new start point, and continuing to determine, along a normal direction of any boundary of the new start point, a region used as a takeoff and landing point in the range of the airport: or if the region does not exist, continuing to determine a takeoff and landing point along a normal direction of another boundary of the start point, and using a determined takeoff and landing point as a re-determined start point.

Optionally, the method further includes: when a takeoff and landing point cannot be determined along a normal direction of each boundary of the start point, determining, according to a sequence of determining each start point, a previous start point of the start point as a specified position; and re-determining the specified position as a start point to continue to determine a takeoff and landing point until a takeoff and landing point cannot be determined within the range of the airport.

Optionally, the determining an initial takeoff and landing point from the multiple takeoff and landing points included in the target layout includes: determining, according to positions of the multiple takeoff and landing points in the target layout and from the multiple takeoff and landing points included in the target layout, a takeoff and landing point positioned in a center of the unmanned aerial vehicle airport as the initial takeoff and landing point.

Optionally, the determining, according to positions of the multiple takeoff and landing points in the target layout, a takeoff and landing point positioned in a center of the unmanned aerial vehicle airport includes: determining a central position of the unmanned aerial vehicle airport according to the airport shape and the airport size: for each takeoff and landing point in the target layout, determining a distance between the takeoff and landing point and the central position of the unmanned aerial vehicle airport; and sorting the multiple takeoff and landing points according to determined distances, and determining, according to the sorting, a takeoff and landing point positioned in the center of the unmanned aerial vehicle airport from the multiple takeoff and landing points.

Optionally, the determining markers respectively allocated to the multiple takeoff and landing points from a predetermined marker set by using the initial takeoff and landing point as a start point, according to a predetermined search algorithm, and by using a constraint that similarity between a marker of any one of the multiple takeoff and landing points and markers of other takeoff and landing points in a specified neighborhood thereof is the lowest includes: determining a marker corresponding to the initial takeoff and landing point from the predetermined marker set: determining any takeoff and landing point to which no marker is allocated and adjacent to the initial takeoff and landing point: determining a marker allocated to the adjacent takeoff and landing point from the marker set by using similarity between the marker of the adjacent takeoff and landing point and markers of other takeoff and landing points in a specified neighborhood thereof being lowest as a constraint; and re-using the adjacent takeoff and landing point as the initial takeoff and landing point, and continuing to allocate a marker to a takeoff and landing point to which no marker is allocated until markers are allocated to the multiple takeoff and landing points.

Optionally, the determining markers respectively allocated to the multiple takeoff and landing points from a predetermined marker set by using the initial takeoff and landing point as a start point, according to a predetermined search algorithm, and by using a constraint that similarity between a marker of any one of the multiple takeoff and landing points and markers of other takeoff and landing points in a specified neighborhood thereof is the lowest includes: searching for the multiple takeoff and landing points in the target layout according to the predetermined search algorithm by using the initial takeoff and landing point as a start point, and determining a search sequence that traverses the multiple takeoff and landing points; and determining, for each found takeoff and landing point according to the search sequence, a marker allocated to the takeoff and landing point from the predetermined marker set by using a constraint that similarity between a marker of the takeoff and landing point and markers of other takeoff and landing points in a specified neighborhood of the takeoff and landing point is the lowest.

Optionally, the determining, for each found takeoff and landing point according to the search sequence, a marker allocated to the takeoff and landing point from the predetermined marker set by using a constraint that similarity between a marker of the takeoff and landing point and markers of other takeoff and landing points in a specified neighborhood of the takeoff and landing point is the lowest includes: allocating a marker to each of the multiple takeoff and landing points according to the search sequence of the multiple takeoff and landing points and a sequence of markers in the predetermined marker set: when all markers in the marker set are allocated, determining whether a takeoff and landing point to which no marker is allocated exists in the multiple takeoff and landing points of the target layout; and if a takeoff and landing point to which no marker is allocated exists in the multiple takeoff and landing points in the target layout, determining, for each takeoff and landing point to which no marker is allocated, a distance between each takeoff and landing point to which a marker is allocated and the takeoff and landing point, as a distance between a marker corresponding to each takeoff and landing point to which a marker is allocated and the takeoff and landing point, and allocating a marker to the takeoff and landing point according to the distance between a marker corresponding to each takeoff and landing point to which a marker is allocated and the takeoff and landing point.

This specification provides an unmanned aerial vehicle landing method, including: determining, according to task information of a task allocated to an unmanned aerial vehicle, a target takeoff and landing point corresponding to the task: determining environment information of the target takeoff and landing point, where the environment information includes a marker corresponding to the target takeoff and landing point and a marker of each takeoff and landing point adjacent to the target takeoff and landing point in an unmanned aerial vehicle airport to which the target takeoff and landing point belongs: performing, according to a collected ground image, target object identification on the ground image, and determining a position of the marker of the target takeoff and landing point in the ground image as a position of the target takeoff and landing point in the ground image; and controlling the unmanned aerial vehicle to land at the target takeoff and landing point according to the position of the target takeoff and landing point.

This specification provides a marker allocation apparatus in an unmanned aerial vehicle airport, including: a first determining module, configured to determine a target layout of an unmanned aerial vehicle airport according to an airport shape and an airport size of the unmanned aerial vehicle airport and a predetermined standard shape and a predetermined standard size of a takeoff and landing point, where the target layout includes multiple takeoff and landing points: a second determining module, configured to determine an initial takeoff and landing point from the multiple takeoff and landing points included in the target layout; and an allocation module, configured to: determine markers respectively allocated to the multiple takeoff and landing points from a predetermined marker set by using the initial takeoff and landing point as a start point, according to a predetermined search algorithm, and by using a constraint that similarity between a marker of any one of the multiple takeoff and landing points and markers of other takeoff and landing points in a specified neighborhood thereof is the lowest, where image content of each marker in the marker set is different.

This specification provides an unmanned aerial vehicle landing apparatus, including: a target determining module, configured to determine, according to task information of a task allocated to an unmanned aerial vehicle, a target takeoff and landing point corresponding to the task: an environment determining module, configured to determine environment information of the target takeoff and landing point, where the environment information includes a marker corresponding to the target takeoff and landing point and a marker of each takeoff and landing point around the target takeoff and landing point in an unmanned aerial vehicle airport to which the target takeoff and landing point belongs: an identification module, configured to: perform, according to a collected ground image, target object identification on the ground image, and determine a position of the marker of the target takeoff and landing point in the ground image as a position of the target takeoff and landing point in the ground image; and a landing module, configured to control the unmanned aerial vehicle to land at the target takeoff and landing point according to the position of the target takeoff and landing point.

This specification provides a computer readable storage medium, where the storage medium stores a computer program, and when the computer program is executed by a processor, the foregoing marker allocation method in an unmanned aerial vehicle airport or unmanned aerial vehicle landing method is implemented.

This specification provides an electronic device, including a memory, a processor, and a computer program that is stored in the memory and that can run on the processor. When executing the program, the processor implements the foregoing marker allocation method in an unmanned aerial vehicle airport or unmanned aerial vehicle landing method.

The foregoing at least one technical solution used in this specification can achieve the following beneficial effects: In the marker allocation method in an unmanned aerial vehicle airport provided in this specification, according to an airport shape and an airport size of an unmanned aerial vehicle airport and a standard shape and a standard size of a takeoff and landing point, a target layout of an unmanned aerial vehicle airport that includes multiple takeoff and landing points is determined: an initial takeoff and landing point is determined from the multiple takeoff and landing points included in the target layout; and markers respectively allocated to the multiple takeoff and landing points are determined from a predetermined marker set that includes markers of different image content, by using the initial takeoff and landing point as a start point, according to a predetermined search algorithm, and by using a constraint that similarity between a marker of any one of the multiple takeoff and landing points and markers of other takeoff and landing points in a specified neighborhood thereof is the lowest.

It can be learned from the foregoing method that, in this method, a position and a correspondence between each takeoff and landing point and each marker in a range of the airport do not need to be manually determined, thereby improving efficiency of allocating a marker in an unmanned aerial vehicle airport.

BRIEF DESCRIPTION OF DRAWINGS

The accompanying drawings described herein are intended to provide further understanding of this specification and constitute a part of this specification. Exemplary embodiments of this specification and the description thereof are used for explaining this specification rather than constituting an improper limitation to this specification. In the accompanying drawings:

FIG. 1 is a schematic flowchart of a marker allocation method in an unmanned aerial vehicle airport according to an embodiment of this specification;

FIG. 2 is a schematic diagram of an extended region for determining a start point according to this specification:

FIG. 5 is a schematic flowchart of an unmanned aerial vehicle landing method according to this specification:

FIG. 6 is a schematic diagram of a marker allocation apparatus in an unmanned aerial vehicle airport according to this specification:

DETAILED DESCRIPTION

Figures 3, 4:
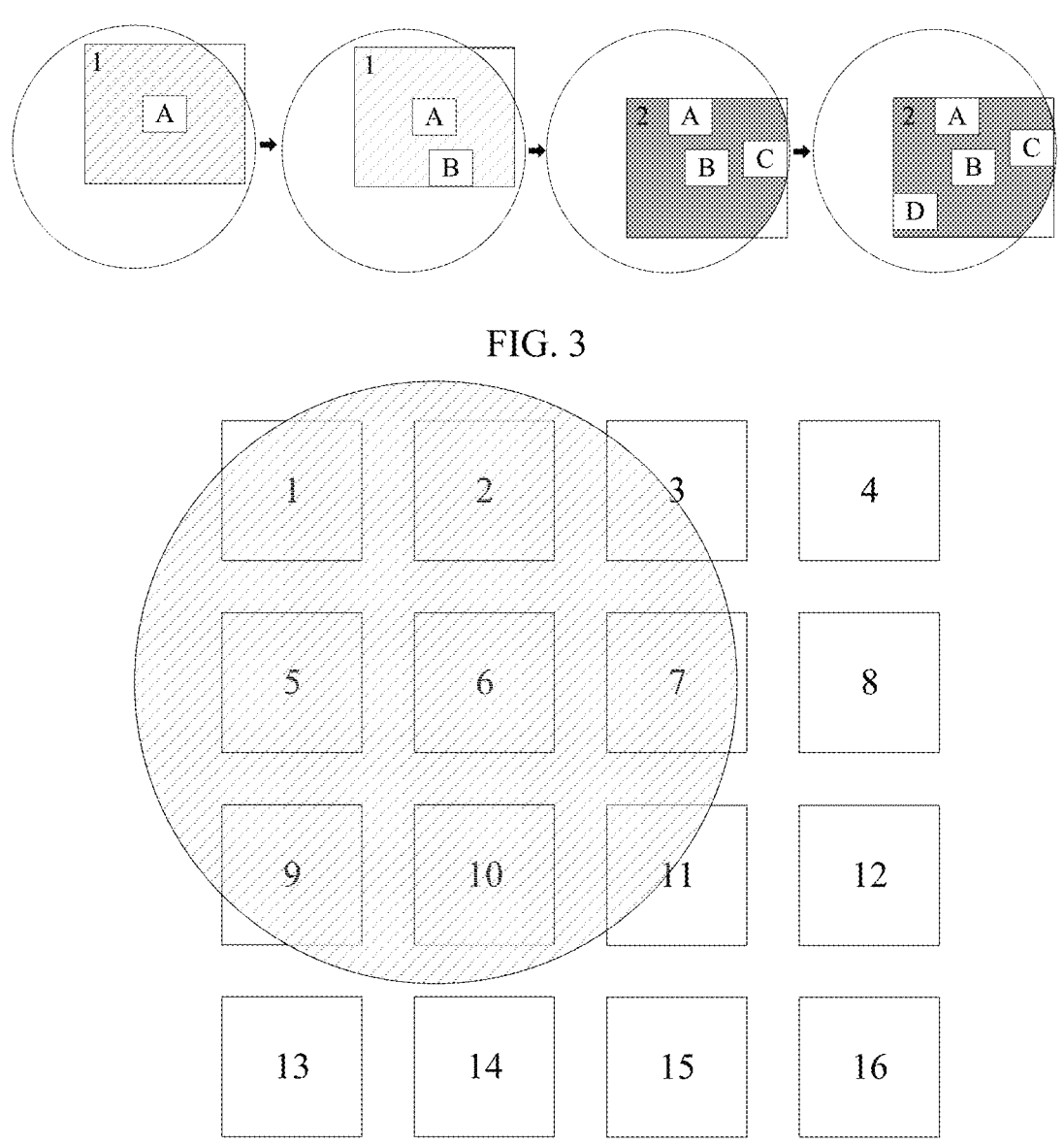
FIG. 3 is a schematic diagram of determining a takeoff and landing point layout according to this specification.
FIG. 4 is a schematic diagram of determining a takeoff and landing point layout according to this specification.

To make the objectives, technical solutions, and advantages of this specification clearer, the technical solutions of this specification will be clearly and comprehensively described below with reference to specific embodiments of this specification and corresponding accompanying drawings. Apparently, the described embodiments are only some embodiments rather than all the embodiments of this specification. All other embodiments obtained by a person of ordinary skill in the art based on the embodiments in this specification without creative efforts shall fall within the protection scope of this specification.

The following describes the technical solution provided in each embodiment of this specification in detail with reference to the accompanying drawings.

FIG. 1 is a schematic flowchart of a marker allocation method in an unmanned aerial vehicle airport according to an embodiment of this specification.

S100: Determine a target layout of an unmanned aerial vehicle airport according to an airport shape and an airport size of the unmanned aerial vehicle airport and a predetermined standard shape and a predetermined standard size of a takeoff and landing point, where the target layout includes multiple takeoff and landing points.

If the layout of the marker in the unmanned aerial vehicle airport is manually set, it takes time and efforts. This specification provides a marker allocation method in an unmanned aerial vehicle airport performed by a server, so that a marker can be allocated to each takeoff and landing point in the unmanned aerial vehicle airport based on the airport shape and the airport size of the unmanned aerial vehicle airport, and the predetermined standard shape and the predetermined standard size of the takeoff and landing point.

Based on this, the server may determine the target layout of the unmanned aerial vehicle airport according to the airport shape and the airport size of the unmanned aerial vehicle airport and the predetermined standard shape and the predetermined standard size of the takeoff and landing point.

In one or more embodiments provided in this specification, the marker allocation method in an unmanned aerial vehicle airport is applied to a scenario in which markers need to be allocated to takeoff and landing points in the unmanned aerial vehicle airport, and is performed by a server of a service provider.

Specifically, the server may pre-store the airport layout and the airport size of the unmanned aerial vehicle airport, and then the server may determine the airport layout and the airport size of the unmanned aerial vehicle airport.

Then, the server may determine the target layout of the takeoff and landing point in the unmanned aerial vehicle airport according to the predetermined standard shape and the predetermined standard size of the takeoff and landing point.

The target layout may be that the server randomly places several takeoff and landing points in the unmanned aerial vehicle airport according to the predetermined standard shape and the predetermined standard size of the takeoff and landing point and the airport layout and the airport size of the unmanned aerial vehicle airport, and determines the target layout according to each takeoff and landing point placed in the unmanned aerial vehicle airport.

Further, to ensure efficiency of the unmanned aerial vehicle in performing a delivery task in the unmanned aerial vehicle airport, the server may determine, for multiple times, takeoff and landing point layouts of the unmanned aerial vehicle airport, and determine, from multiple takeoff and landing point layouts according to a quantity of takeoff and landing points included in each takeoff and landing point layout, a takeoff and landing point layout that includes a maximum quantity of takeoff and landing points as a target layout of the takeoff and landing point in the unmanned aerial vehicle airport.

Still further, when determining the takeoff and landing point layout, if the takeoff and landing point layout is determined only by randomly placing the takeoff and landing point in the unmanned aerial vehicle airport, a quantity of takeoff and landing points included in the takeoff and landing point layout may be small, and consequently, a quantity of takeoff and landing points included in the determined target layout may also be small. However, if a takeoff and landing point is randomly determined in the unmanned aerial vehicle airport as a start point, and another takeoff and landing point is determined around the start point by using the start point as a center, a quantity of takeoff and landing points included in the determined takeoff and landing point layout may be larger.

Therefore, to ensure takeoff and landing efficiency of the unmanned aerial vehicle airport, the server may randomly determine a takeoff and landing point from the unmanned aerial vehicle airport as a start point.

Then, the server may determine another takeoff and landing point around the takeoff and landing point based on the takeoff and landing point, and further determine, according to the determined another takeoff and landing point, a takeoff and landing point layout corresponding to the takeoff and landing point.

S102: Determine an initial takeoff and landing point from the multiple takeoff and landing points included in the target layout.

In one or more embodiments provided in this specification, markers of takeoff and landing points are placed in the unmanned aerial vehicle airport, so as to ensure takeoff and landing efficiency of the unmanned aerial vehicle airport. A quantity of markers is limited, and a quantity of takeoff and landing points determined in the target layout may be more than the quantity of markers. In a landing process of the unmanned aerial vehicle, if multiple markers that are the same as a marker of a target takeoff and landing point of the unmanned aerial vehicle exist in a field of view of an image collection device of the unmanned aerial vehicle, a case in which the unmanned aerial vehicle cannot land may occur. Therefore, the server may search for each marker in the target layout, and allocate a marker to each takeoff and landing point.

Based on this, the server may determine the initial takeoff and landing point from the target layout.

Specifically, the server may randomly determine any takeoff and landing point from the takeoff and landing points included in the target layout as a takeoff and landing point for placing an initial marker, that is, the initial takeoff and landing point.

Further, if the initial takeoff and landing point is positioned in a central position of the unmanned aerial vehicle airport, a search speed and search efficiency are relatively high when subsequently searching for each takeoff and landing point in the unmanned aerial vehicle airport based on the initial takeoff and landing point. Therefore, the server may further determine, from the takeoff and landing points according to the position of the target layout, a takeoff and landing point positioned in the center of the unmanned aerial vehicle airport as the takeoff and landing point for placing the initial marker.

Specifically, the server may first determine a position of each takeoff and landing point in the target layout. The position of each takeoff and landing point may include a central position of the takeoff and landing point and/or an orientation of the takeoff and landing point. Each takeoff and landing point has a standard shape and a standard size.

Then, the server may determine the central position of the unmanned aerial vehicle airport according to the airport shape of the unmanned aerial vehicle airport.

Finally, the server may determine, according to the position of each takeoff and landing point, the central position of the unmanned aerial vehicle airport, and the size of the unmanned aerial vehicle airport, a distance between each takeoff and landing point and the central position of the unmanned aerial vehicle airport, and select a takeoff and landing point that is in the takeoff and landing points and that has a shortest distance from the central position of the unmanned aerial vehicle airport as a takeoff and landing point positioned in the center of the unmanned aerial vehicle airport, and use the takeoff and landing point positioned in the center of the unmanned aerial vehicle airport as the initial takeoff and landing point.

Certainly, when the server determines the takeoff and landing point positioned in the center of the unmanned aerial vehicle airport, the server may further sort the takeoff and landing points according to distances between the center of the takeoff and landing points and the central position of the unmanned aerial vehicle airport, and determine the initial takeoff and landing point from takeoff and landing points with a distance less than a predetermined threshold according to the sorting.

In addition, the foregoing purpose of determining the takeoff and landing point positioned in the center of the unmanned aerial vehicle airport as the initial takeoff and landing point is to ensure search efficiency of the takeoff and landing point. However, when there is a relatively small quantity of takeoff and landing points included in the target layout, search efficiency when the takeoff and landing point positioned in the center of the unmanned aerial vehicle airport is used as the initial takeoff and landing point for searching is slightly different search efficiency when any takeoff and landing point is randomly determined from the takeoff and landing points included in the target layout and is used as the initial takeoff and landing point for searching. Instead, it takes a long time for performing the step of determining the takeoff and landing point positioned in the center of the unmanned aerial vehicle airport, which has large impact on search efficiency. Therefore, in this speci-fication, the server may further randomly determine any takeoff and landing point from the takeoff and landing points included in the target layout as the initial takeoff and landing point. Alternatively, step S102 is not performed, any takeoff and landing point is directly randomly determined from the takeoff and landing points included in the target layout, and step S104 is performed by using the takeoff and landing point as a center.

S104: Determine markers respectively allocated to the multiple takeoff and landing points from a predetermined marker set by using the initial takeoff and landing point as a start point, according to a predetermined search algorithm, and by using a constraint that similarity between a marker of any one of the multiple takeoff and landing points and markers of other takeoff and landing points in a specified neighborhood thereof is the lowest, where image content of each marker in the marker set is different.

In one or more embodiments provided in this specifica-tion, when the unmanned aerial vehicle performs visual-guided landing, the unmanned aerial vehicle generally relies on a marker of a target takeoff and landing point in a collected ground image. However, if another takeoff and landing point whose marker is the same as the marker of the target takeoff and landing point exists in the field of view of the unmanned aerial vehicle, the unmanned aerial vehicle may randomly select any takeoff and landing point from takeoff and landing points corresponding to the marker of the target takeoff and landing point and included in the field of view: causing a landing error: or the unmanned aerial vehicle cannot identify the target takeoff and landing point, stops landing, and reports an exceptional condition to the server, resulting in a hidden safety danger.

Based on this, to ensure that the unmanned aerial vehicle can smoothly perform a landing operation in the unmanned aerial vehicle airport, when allocating a marker to the takeoff and landing point, the server may determine markers allo-cated to the takeoff and landing points from a predetermined marker set according to a predetermined search algorithm, and by using a constraint that similarity between a marker of any takeoff and landing point and markers of other takeoff and landing points in a specified neighborhood thereof is the lowest.

Specifically, for each found takeoff and landing point, the server may determine other takeoff and landing points in a specified neighborhood of the takeoff and landing point, and determine a marker of each of the other takeoff and landing points. The specified neighborhood may be a circular region that is determined according to a predetermined radius and that is centered on the found takeoff and landing point. Certainly, the specified region may alternatively be a poly-gon or a rectangle centered on the found takeoff and landing point. A specific shape, size, or the like of the specified region may be set as required, which is not limited in this specification.

Then, the server may determine, for each marker in the predetermined marker set, similarity between the marker and markers of other takeoff and landing points in a specified neighborhood of the found takeoff and landing point. The similarity may be similarity between image content corre-sponding to the markers, for example, a product.

Finally, the server may determine, from the marker set according to the determined similarity corresponding to the markers in the marker set, a marker to be allocated to the found takeoff and landing point.

In the unmanned aerial vehicle airport determined accord-ing to the foregoing method for allocating a marker to each takeoff and landing point included in the target layout, when the unmanned aerial vehicle performs a landing operation, the marker corresponding to the target landing point has lowest similarity with the markers corresponding to the other takeoff and landing points in the specified neighbor-hood thereof, that is, when the unmanned aerial vehicle performs visual-guided landing, another takeoff and landing point whose marker is the same as the marker of the target takeoff and landing point does not exist in the field of view of the unmanned aerial vehicle, so that the unmanned aerial vehicle can smoothly land in the unmanned aerial vehicle airport.

Still further, in this specification, to ensure allocation efficiency, each time a takeoff and landing point is found according to the search sequence by using the initial takeoff and landing point as the start point, the server may allocate a marker to the takeoff and landing point.

Specifically, the server may randomly determine any marker from the predetermined marker set as a marker corresponding to the initial takeoff and landing point. Cer-tainly, a sequence of the markers in the marker set may be determined first, and the marker corresponding to the initial takeoff and landing point is determined according to the sequence of the markers in the marker set. For example, the initial takeoff and landing point is the first takeoff and landing point in the target layout of the unmanned aerial vehicle airport, and the marker corresponding to the takeoff and landing point may be the first marker in the marker set. Specifically, how to determine the marker of the initial takeoff and landing point may be set according to a require-ment, which is not limited in this specification.

Then, the server may search for the takeoff and landing point in the target layout according to the predetermined search algorithm by using the initial takeoff and landing point as a start point, and each time a takeoff and landing point is found, determine a marker of each takeoff and landing point in a specified neighborhood of the takeoff and landing point. Further, for each marker in the marker set, similarity between the marker and the marker of each takeoff and landing point in the specified neighborhood of the takeoff and landing point is determined.

Finally, the server may select, from the marker set according to the determined similarity corresponding to each marker in the marker set, a marker that has lowest similarity with the marker of each takeoff and landing point in the specified neighborhood of the takeoff and landing point as the marker to be allocated to the takeoff and landing point.

Certainly, if similarity of multiple markers is the lowest, any marker may be randomly determined from the multiple markers with the lowest similarity, and is allocated to the takeoff and landing point.

According to the foregoing method for allocating a marker to a takeoff and landing point while searching, a marker can be quickly allocated to each takeoff and landing point in the target layout, thereby improving allocation efficiency of each marker, so that a service provider can quickly place a marker in the unmanned aerial vehicle airport based on an allocation result, improving delivery efficiency.

In addition, the marker allocation method in an unmanned aerial vehicle airport provided in this specification aims at allocating, to each takeoff and landing point in the unmanned aerial vehicle airport, a marker different from that of a surrounding takeoff and landing point. However, similarity between markers is determined according to image content corresponding to the markers, and more computing resources and long computing time are required.

However, for each marker included in each marker set, if the marker is different from all markers of takeoff and landing points in a specified neighborhood of a found takeoff and landing point, it may be considered that similarity between the marker and the marker of each takeoff and landing point around the takeoff and landing point is a specified first value, which meets a condition of allocating the marker to the takeoff and landing point. If the marker is the same as a marker of any takeoff and landing point in the specified neighborhood of the found takeoff and landing point, it may be considered that the similarity between the marker and the marker of each takeoff and landing point around the takeoff and landing point is a specified second value, which does not meet the condition of allocating the marker to the takeoff and landing point.

Apparently, according to a result of determining whether image content of each marker is the same, a marker to be allocated to the found takeoff and landing point can be determined, a requirement for a computing resource is lower, and determining time is shorter.

Based on this, to ensure efficiency of allocating a marker to a takeoff and landing point, when determining the marker to be allocated to the found takeoff and landing point, the server may determine, for each marker in the marker set based on the image content of each marker, whether image content of the marker is the same as image content of the marker of each takeoff and landing point in the specified neighborhood of the takeoff and landing point.

If the same, it may be determined that the marker is not to be allocated to the takeoff and landing point.

If not the same, it may be determined to allocate the marker to the takeoff and landing point.

Certainly, if there are multiple markers in the marker set whose similarity with markers of the takeoff and landing points around the takeoff and landing point is the first value, the server may select any marker from the markers whose similarity is the first value as the marker to be allocated to the takeoff and landing point.

According to the foregoing method for determining the similarity according to the result of determining whether the image content of each marker is the same, and further allocating the marker to each takeoff and landing point by using a constraint of lowest similarity, when the similarity is determined, a requirement for a computing resource is lower, and determining time is shorter, which ensures efficiency of allocating the marker.

Further, when the marker to be allocated to the found takeoff and landing point is determined, similarity between each marker in the marker set and the marker of each takeoff and landing point in the specified neighborhood of the takeoff and landing point may be 1.

For example, the marker set includes four markers in total: a marker 1, a marker 2, a marker 3, and a marker 4. It is assumed that four takeoff and landing points: a takeoff and landing point B, a takeoff and landing point C, a takeoff and landing point D, and a takeoff and landing point E exist in a specified neighborhood of a takeoff and landing point A, a marker allocated to the takeoff and landing point B is the marker 1, a marker allocated to the takeoff and landing point C is the marker 2, a marker allocated to the takeoff and landing point D is the marker 3, and a marker allocated to the takeoff and landing point E is the marker 4. Similarity between each marker in the marker set and the markers of the takeoff and landing points around the takeoff and landing point A is the same, and the similarity is 1.

Based on this, to avoid a case in which a marker cannot be allocated to the takeoff and landing point when the foregoing case occurs, and allocation efficiency is relatively low; the server may further determine similarity between each marker in the marker set and the marker of each takeoff and landing point in the specified neighborhood of the takeoff and landing point according to distances.

Specifically, for each found takeoff and landing point, the server may determine a distance between each takeoff and landing point in a specified neighborhood of the takeoff and landing point and the takeoff and landing point, and use the distance as a distance between each marker corresponding to each takeoff and landing point in the specified neighborhood of the takeoff and landing point and the takeoff and landing point.

Then, for each marker, the server may determine similarity between the marker and the marker of each takeoff and landing point in the specified neighborhood of the takeoff and landing point based on the distance between the marker and the takeoff and landing point. The similarity is inversely proportional to the distance.

According to the foregoing method for determining the similarity based on the distance, when similarity between each marker in a marker set and a marker of each takeoff and landing point around a found takeoff and landing point is the same, that is, when any marker in the marker set has been allocated to another takeoff and landing point in the specified neighborhood of the takeoff and landing point, a marker can still be allocated to the takeoff and landing point according to a distance between each marker and the takeoff and landing point, which ensures search efficiency.

It should be noted that the foregoing search algorithm may be a depth-first search algorithm, a breadth-first search algorithm, or another search algorithm. A specific search algorithm type and use method may be set according to a requirement. This is not limited in this specification.

Based on the method in FIG. 1, according to an airport shape and an airport size of an unmanned aerial vehicle airport and a standard shape and a standard size of a takeoff and landing point, a target layout of an unmanned aerial vehicle airport that includes several takeoff and landing points is determined: an initial takeoff and landing point is determined from the multiple takeoff and landing points included in the target layout; and a marker to be allocated to each takeoff and landing point is determined from a predetermined marker set that includes markers of different image content, by using the initial takeoff and landing point as a start point, according to a predetermined search algorithm, and by using a constraint that similarity between a marker of any takeoff and landing point and markers of other takeoff and landing points in a specified neighborhood thereof is the lowest. In this method, a position and a correspondence between each takeoff and landing point and each marker in an airport range do not need to be manually determined, which improves efficiency of allocating a marker in an unmanned aerial vehicle airport, and also improves efficiency of generating an unmanned aerial vehicle airport that includes a takeoff and landing point and a marker corresponding to each takeoff and landing point.

In addition, to ensure running efficiency of the server, generally, a server that executes the marker allocation method in an unmanned aerial vehicle airport is still executing another service while executing a service of allocating a marker to a takeoff and landing point in the unmanned aerial vehicle airport, and the foregoing manner of allocating a marker to a found takeoff and landing point while searching needs to occupy a relatively large quantity of computing resources. Therefore, the following case may occur: a large quantity of computing resources may need to be occupied to execute the marker allocation method in an unmanned aerial vehicle airport, and current available computing resources of the server are insufficient to support execution of the marker allocation method in an unmanned aerial vehicle airport. Consequently, the server is currently under excessive pressure and shuts down.

Based on this, the server may split the step of allocating the marker to the found takeoff and landing point into searching for takeoff and landing points within the airport range, determining a search sequence of each takeoff and landing point, and for each found takeoff and landing point, determine, from the marker set according to the determined search sequence by using a constraint that similarity between a marker of the takeoff and landing point and other markers in a specified neighborhood of the takeoff and landing point is the lowest, a marker to be allocated to the takeoff and landing point. Determining the search sequence may be performed in a different time period from allocating the marker according to the search sequence.

Specifically, the search algorithm may be a deep search algorithm. In this case, the server may use the initial takeoff and landing point as the center, and determine, along a normal direction of any boundary around the initial takeoff and landing point, whether there is a takeoff and landing point adjacent to the initial takeoff and landing point.

If yes, the server may use the determined takeoff and landing point adjacent to the initial takeoff and landing point as a re-determined initial takeoff and landing point, and continue to determine, by using the re-determined initial takeoff and landing point as the center, a takeoff and landing point adjacent to the initial takeoff and landing point.

If no, the server may continue to determine, along a normal direction of another boundary other than the boundary of the initial takeoff and landing point, the takeoff and landing point adjacent to the initial takeoff and landing point until the initial takeoff and landing point cannot be determined.

Then, the server may determine, according to a sequence in which each takeoff and landing point is determined as the initial takeoff and landing point, a search sequence of each takeoff and landing point.

Finally, after determining the search sequence, the server may determine a current load status of the server, and when determining, according to the load status, that current computing resources are sufficient, for each found takeoff and landing point, determine, from the predetermined marker set according to the search sequence by using a constraint that similarity between a marker of the takeoff and landing point and other markers in a specified neighborhood of the takeoff and landing point is the lowest, a marker to be allocated to the takeoff and landing point.

Content of allocating the marker to the takeoff and landing point by using the similarity as the constraint may be content in the foregoing step S104, and details are not described in this specification again.

In addition, the foregoing phase of determining the search sequence and the phase of allocating the marker to the takeoff and landing point according to the search sequence may be that the server stores corresponding data, and when detecting that computing resources of the server are sufficient, performs steps corresponding to the corresponding phase according to the stored data. A time period of the phase of determining the search sequence and a time period of the phase of allocating the marker to the takeoff and landing point according to the search sequence may be adjacent time periods, or may be different time periods.

Certainly, if a takeoff and landing point adjacent to the initial takeoff and landing point cannot be determined according to the initial takeoff and landing point, the server may further use a specified region corresponding to the initial takeoff and landing point as a re-determined initial takeoff and landing point, and continue to search for each takeoff and landing point in the target layout based on the re-determined initial takeoff and landing point, until each takeoff and landing point in the target layout is determined as the initial takeoff and landing point.

The specified region is a corresponding initial takeoff and landing point when the initial takeoff and landing point is used as a determined initial takeoff and landing point adjacent to the initial takeoff and landing point. For example, the initial takeoff and landing point A is used as the center, and the takeoff and landing point B adjacent to the initial takeoff and landing point A may be determined. When the takeoff and landing point B is used as the re-determined initial takeoff and landing point, a takeoff and landing point adjacent to the initial takeoff and landing point B cannot be determined. In this case, the server may use the takeoff and landing point A as the re-determined initial takeoff and landing point, and continue to determine another takeoff and landing point, other than the takeoff and landing point B, adjacent to the initial takeoff and landing point A until a takeoff and landing point cannot be determined according to the initial takeoff and landing point A.

According to the foregoing manner in which the search sequence is first determined, and then the marker is allocated to the takeoff and landing point according to the search sequence, the search sequence may be first determined in a case in which the computing resources of the server are insufficient, and then the marker is allocated to the takeoff and landing point according to the search sequence, which avoids a case in which the server shuts down due to excessive running pressure. In addition, when the computing resources are sufficient, the marker is allocated to the takeoff and landing point according to the search sequence, which can ensure allocation efficiency of the takeoff and landing point.

It should be noted that, image content of the foregoing markers is different, and image content of markers allocated to adjacent takeoff and landing points is different.

In addition, if the quantity of takeoff and landing points in the target layout is not greater than the quantity of markers in the marker set, different markers can be allocated to the takeoff and landing points only according to the search sequence of each takeoff and landing point and the sequence of the markers. However, if the quantity of takeoff and landing points in the target layout is greater than the quantity of markers in the marker set, after different markers are first allocated to the takeoff and landing points according to the search sequence of the takeoff and landing points and the sequence of the markers, a constraint that similarity between a marker of any takeoff and landing point and markers of other takeoff and landing points in a specified neighborhood of the any takeoff and landing point is the lowest is used to determine, from the predetermined marker set, a marker to be allocated to another takeoff and landing point to which no marker is allocated, which can further reduce required computing resources.

Specifically, when all markers in the marker set are allocated, the server may determine whether there is a takeoff and landing point to which no marker is allocated in the target layout.

If there is a takeoff and landing point to which no marker is allocated in the target layout, for each takeoff and landing point to which no marker is allocated, the server may separately determine a distance between each takeoff and landing point to which a marker is allocated and the takeoff and landing point, and use the distance as a distance between a marker corresponding to each takeoff and landing point to which a marker is allocated and the takeoff and landing point. In addition, a marker is allocated to each takeoff and landing point according to a distance between a marker corresponding to the takeoff and landing point to which a marker is allocated and the takeoff and landing point.

The step of allocating a marker to each takeoff and landing point according to a distance between a marker corresponding to the takeoff and landing point to which a marker is allocated and the takeoff and landing point may be: for each marker, determining a minimum distance between the marker and the takeoff and landing point. The minimum distance is a minimum distance in distances between takeoff and landing points corresponding to the marker and the takeoff and landing point. For example, it is assumed that there are takeoff and landing points A and B corresponding to the marker, a marker currently needs to be allocated to a takeoff and landing point C, a distance between the point A and the point C is 7 m, and a distance between the point B and the point C is 9 m. In this case, a minimum distance between the marker and the takeoff and landing point C is 7 m.

After determining the minimum distance between the markers and the takeoff and landing point, the server may sort the markers according to the minimum distance, and select, according to the sorting, a marker that is farthest from the takeoff and landing point as the marker to be allocated to the takeoff and landing point. Certainly, the server may determine a distance threshold according to a field of view range when the unmanned aerial vehicle performs a landing operation; and determine, based on the distance threshold from takeoff and landing points whose minimum distances from the takeoff and landing point are not less than the distance threshold, the marker to be allocated to the takeoff and landing points.

If there is no takeoff and landing point to which no marker is allocated in the target layout, the server may determine that a marker is allocated to each takeoff and landing point in the unmanned aerial vehicle airport, and in the unmanned aerial vehicle airport, the unmanned aerial vehicle can perform a takeoff or landing operation based on each takeoff and landing point and the marker of each takeoff and landing point.

According to the foregoing case in which the marker is first allocated to the takeoff and landing point according to the search sequence and the sequence of the marker, and then in a case in which all markers are allocated, but there is still a takeoff and landing point to which no marker is allocated, for a takeoff and landing point to which no marker is allocated, a constraint that similarity between a marker of the takeoff and landing point and a marker of another takeoff and landing point around the takeoff and landing point is the lowest is used to allocate a marker to the takeoff and landing point. Computing resources required for allocating the marker to the takeoff and landing point may be further reduced, thereby reducing a risk that the server shuts down due to excessive pressure when executing the service for allocating the marker to the takeoff and landing point.

Certainly, for the foregoing step of allocating a marker to each takeoff and landing point to which no marker is allocated, references may be made to the description in the foregoing step S104. For each takeoff and landing point to which no marker is allocated, a marker to be allocated to the takeoff and landing point is determined from the marker set according to the search sequence by using a constraint that similarity between a marker of the takeoff and landing point and markers of other takeoff and landing points in a specified neighborhood of the takeoff and landing point is the lowest, until markers are allocated to all takeoff and landing points in the target layout.

In addition, because impact of different markers on accurate landing of the unmanned aerial vehicle is not considered in the related technology, the related technology generally includes only one target landing point. The service provider sets a marker of only one takeoff and landing point, so as to ensure that the unmanned aerial vehicle can precisely land according to the marker of the takeoff and landing point. Therefore, when accurate landing is performed at a same target landing point, only one unmanned aerial vehicle can land each time. As a result, delivery efficiency of the unmanned aerial vehicle is relatively low, and space utilization of the target landing point is relatively low. However, according to the marker allocation method in an unmanned aerial vehicle airport provided in this specification, an unmanned aerial vehicle airport including multiple takeoff and landing points may be generated for one target landing point, that is, multiple unmanned aerial vehicles can simultaneously land at the unmanned aerial vehicle airport.

Further, to ensure efficiency of allocating the marker, the search algorithm may further be a breadth limited search algorithm, that is, by using the initial takeoff and landing point as the center and along a normal direction of each boundary of the initial takeoff and landing point, a takeoff and landing point adjacent to the initial takeoff and landing point is searched for as a first takeoff and landing point, and by using each first takeoff and landing point as a start point and continuing to search, along a normal direction of another boundary of the first takeoff and landing point other than the boundary adjacent to the initial takeoff and landing point, for a takeoff and landing point that is not searched for and that is adjacent to each first takeoff and landing point as each second takeoff and landing point. Each second takeoff and landing point is further used as a start point, a third takeoff and landing point continues to be searched for . . . until each takeoff and landing point in the target layout is searched for. Certainly, the search algorithm may alternatively be another algorithm, and a specific type of the search algorithm and a use method may be set according to a requirement. This is not limited in this specification.

According to the marker allocation method in an unmanned aerial vehicle airport provided in embodiments of the present invention, an unmanned aerial vehicle airport that can be used for dense takeoff and landing can be obtained, thereby greatly improving delivery efficiency of an unmanned aerial vehicle and space utilization of a target landing point.

In addition, because a takeoff and landing point has a standard shape and a standard size, to ensure safety when the unmanned aerial vehicle lands, there is usually a spacing between takeoff and landing points. However, according to the shape and the predetermined spacing of the takeoff and landing point, a determined takeoff and landing point layout generally includes a relatively large quantity of takeoff and landing points. Therefore, the server may determine, according to the position of the start point, the range of the unmanned aerial vehicle airport, the standard shape, the standard size, and the predetermined spacing, an extended region corresponding to the start point. As shown in FIG. 2.

FIG. 2 is a schematic diagram of an extended region for determining a start point according to this specification. In FIG. 2, a circle is an unmanned aerial vehicle airport, a rectangle A is a start point, d and h are respectively a length and a width that are determined according to a standard size and a standard shape of the takeoff and landing point, and l is a predetermined spacing. Therefore, based on a range of the unmanned aerial vehicle airport, the standard shape, the standard size, the predetermined spacing, and a position of the start point, the start point may be used as a center, and may be extended circumferentially, to determine an extended region of the start point. In FIG. 2, a rectangle B is an extended region of the start point, and an overlapping part between the extended region and the unmanned aerial vehicle airport is used as an extended region of the start point. That is, a shaded part in FIG. 2 is used as an extended region of the start point.

After the start point is determined, the server may determine, in the extended region corresponding to the start point along any normal direction of the start point, a takeoff and landing point separated from the start point by the predetermined spacing. A direction of the determined takeoff and landing point separated from the start point by the predetermined spacing is consistent with a direction of the start point, but a connection line between a central point of the determined takeoff and landing point and a central point of the start point may not coincide with a normal direction of any boundary of the start point. That is, a normal direction of any boundary of the start point is any direction that is perpendicular to any boundary of the start point and that has an intersection with the boundary of the start point. The rectangle A in FIG. 2 is used as an example. Along a normal direction of a right boundary of the rectangle A, both an extension line of an upper boundary of the rectangle A and an extension line of a lower boundary of the rectangle A are the normal direction of the right boundary of the start point A.

It should be noted that, the determined takeoff and landing point separated from the start point by the predetermined spacing is not only separated from the start point by the predetermined spacing, but also separated from a determined takeoff and landing point by the predetermined spacing or at least by the predetermined spacing, so as to ensure safety of the unmanned aerial vehicle when the unmanned aerial vehicle performs a takeoff or landing operation in the unmanned aerial vehicle airport.

After determining the takeoff and landing point separated from the start point by the predetermined spacing, the server may re-use the determined takeoff and landing point separated from the start point by the predetermined spacing as a start point, determine an extended region of the start point, and continue to determine another takeoff and landing point in another region, in the re-determined extended region, other than the region that is determined as a takeoff and landing point until a takeoff and landing point cannot be determined. In this case, the server may determine a takeoff and landing point layout according to determined multiple takeoff and landing points. As shown in FIG. 3.

FIG. 3 is a schematic diagram of determining a takeoff and landing point layout according to this specification. In the figure, a rectangle A is a start point, a rectangle 1 around the rectangle A is an extended region of the start point A. and a shaded part in the extended region of the start point A is an extended region of the start point A. Along any normal direction of the start point A, a takeoff and landing point B may be determined in the extended region of the start point A as a re-determined start point, and an extended region of the start point B is determined according to the start point B, that is, a rectangle 2. A gray part of the rectangle 2 is an extended region of the rectangle 2. In this case, a takeoff and landing point C may be determined in the extended region of the start point B. and used as a re-determined start point. However, if a takeoff and landing point adjacent to the start point C cannot be determined in the extended region determined by using the takeoff and landing point C, the server may use a specified position of the start point C as a re-determined start point. A previous start point of the start point C is determined according to a sequence of determining the start points, and is used as a specified position, that is, the start point B.

The server may determine, based on the start point B and along a normal direction of any boundary of the start point B, a takeoff and landing point D in another region, other than the region determined as a takeoff and landing point, in the extended region corresponding to the start point, and the server may use the takeoff and landing point D as a start point.

Still further, because multiple takeoff and landing point layouts need to be determined in step S100, after determining the takeoff and landing point layouts, the server may determine whether a quantity of generated takeoff and landing point layouts is less than a predetermined quantity threshold. If the quantity of generated takeoff and landing point layouts is less than the predetermined quantity threshold, the server may randomly re-determine a takeoff and landing point in the range of the unmanned aerial vehicle airport, and continue to determine a takeoff and landing point layout until a quantity of determined takeoff and landing point layouts reaches the predetermined quantity threshold. If the quantity of generated takeoff and landing point layouts is greater than or equal to the predetermined quantity threshold, the server may skip continuing to determine a takeoff and landing point layout. In an example in which the predetermined quantity threshold is 100, if the quantity of generated takeoff and landing point layouts is 98 after takeoff and landing point layouts are determined, the server may determine that the quantity of generated takeoff and landing point layouts is less than the predetermined quantity threshold, and needs to continue to determine a takeoff and landing point layout. If the quantity of generated takeoff and landing point layouts is 100 after the takeoff and landing point layouts are determined, the server may determine that the quantity of generated takeoff and landing point layouts is not less than the predetermined quantity threshold, and does not need to re-determine a takeoff and landing point layout. The server may determine a quantity of takeoff and landing points included in each takeoff and landing point layout, and further determine the target layout. Certainly, the quantity of takeoff and landing point layouts may be set according to a requirement. This is not limited in this specification.

In addition, there may be a case in which a takeoff and landing point cannot be determined along a normal direction of any boundary of the start point, but a takeoff and landing point may still be determined along a normal direction of another boundary of the start point other than the boundary. Therefore, when a takeoff and landing point cannot be determined in the extended region along the normal direction of any boundary of the start point, the server may continue to determine a takeoff and landing point along a normal direction of another boundary of the start point other than the boundary until a takeoff and landing point cannot be determined according to the start point.

Further, there may also be a case in which a takeoff and landing point at a predetermined spacing from the start point cannot be determined along the start point, but a takeoff and landing point may still be determined in the unmanned aerial vehicle airport. Therefore, when a takeoff and landing point cannot be determined according to the start point, that is, when a takeoff and landing point cannot be determined along any normal direction of any boundary of the start point, the server may re-determine a specified position of the takeoff and landing point as a start point, so as to continue to determine a takeoff and landing point until a takeoff and landing point cannot be determined in the unmanned aerial vehicle airport.

The specified position corresponding to the start point is a previous start point of the current start point according to a sequence in which each takeoff and landing point is determined as a start point. That is, the previous start point of the current start point is used as a specified position of the current start point.

In addition, to ensure generation efficiency of the target layout, the server may further determine a takeoff and landing point arrangement according to a region shape, a region size, a predetermined spacing, and the like. After the airport shape and the airport size of the unmanned aerial vehicle airport are determined, a central position of the airport is randomly determined in the takeoff and landing point arrangement according to the airport shape and the airport size, and the takeoff and landing point layout is determined according to the range and the size of the unmanned aerial vehicle airport and each takeoff and landing point included in the range of the unmanned aerial vehicle airport. As shown in FIG. 4.

FIG. 4 is a schematic diagram of determining a takeoff and landing point layout according to this specification. In the figure, rectangles 1, 2, 3, 4, 5, 6, 7, 8, 9, 10, 11, 12, 13, 14, 15, and 16 are takeoff and landing points included in a takeoff and landing point arrangement determined according to the standard shape and the standard size of the takeoff and landing point, the predetermined spacing, and the like. In this case, the server may randomly determine the central position of the unmanned aerial vehicle airport in the takeoff and landing point arrangement. For example, a circle is the range of the unmanned aerial vehicle airport, and takeoff and landing points included in a shaded part are takeoff and landing points included in the unmanned aerial vehicle airport. The takeoff and landing points included in the unmanned aerial vehicle airport are takeoff and landing points 2, 5, 6, and 10 respectively. The takeoff and landing point layout may be determined according to the takeoff and landing points 2, 5, 6, and 10 and a circle containing shadows.

Certainly, after determining the takeoff and landing point layout, the server may also determine whether the quantity of generated takeoff and landing point layouts is less than the predetermined quantity threshold. If the quantity of generated takeoff and landing point layouts is less than the predetermined quantity threshold, the server may randomly re-determine a takeoff and landing point in the range of the unmanned aerial vehicle airport, and continue to determine a takeoff and landing point layout until a quantity of determined takeoff and landing point layouts reaches the predetermined threshold. If the quantity of generated takeoff and landing point layouts is greater than or equal to the predetermined quantity threshold, the server may skip continuing to determine a takeoff and landing point layout.

In one or more embodiments provided in this specification, to ensure delivery efficiency, the server may determine that the quantity of takeoff and landing points in the unmanned aerial vehicle airport is maximized. Therefore, the server may determine quantities of takeoff and landing points included in multiple takeoff and landing point layouts, and determine the target layout based on the quantities of takeoff and landing points.

Specifically, for each takeoff and landing point layout, the server may determine a quantity of takeoff and landing points in the takeoff and landing point layout.

Then, the server may sort the takeoff and landing point layouts according to the determined quantities.

Finally, based on the sorting, the server may select, as the target layout, a takeoff and landing point layout that includes a largest quantity of takeoff and landing points.

Certainly, if there are multiple takeoff and landing point layouts that include the largest quantity of takeoff and landing points, the server may randomly determine a takeoff and landing point layout from the takeoff and landing point layouts that include the largest quantity of takeoff and landing points as the target layout of the unmanned aerial vehicle airport.

In addition, the server may further predetermine a takeoff and landing point threshold. In this case, the server may determine a quantity of takeoff and landing points included in each takeoff and landing point layout, and determine, as a candidate takeoff and landing point layout, a takeoff and landing point layout that includes a quantity of takeoff and landing points that is greater than the predetermined takeoff and landing point threshold. The server may randomly determine, from each candidate takeoff and landing point layout, any candidate takeoff and landing point layout as the target layout.

A specific method for determining the target layout may be set according to a requirement. This is not limited in this specification.

Based on the marker allocation method in an unmanned aerial vehicle airport shown in FIG. 1, this specification further provides an unmanned aerial vehicle landing method, as shown in FIG. 5.

FIG. 5 is a schematic flowchart of an unmanned aerial vehicle landing method according to this specification, including:

S200: Determine, according to task information of a task allocated to an unmanned aerial vehicle, a target takeoff and landing point corresponding to the task.

S202: Determine environment information of the target takeoff and landing point, where the environment information includes a marker corresponding to the target takeoff and landing point and a marker of each takeoff and landing point around the target takeoff and landing point in an unmanned aerial vehicle airport to which the target takeoff and landing point belongs.

S204: Perform, according to a collected ground image, target object identification on the ground image, and determine a position of the marker of the target takeoff and landing point in the ground image as a position of the target takeoff and landing point in the ground image.

S206: Control the unmanned aerial vehicle to land at the target takeoff and landing point according to the position of the target takeoff and landing point.

Generally, in the unmanned aerial vehicle delivery field, the unmanned aerial vehicle usually controls, according to a position of the unmanned aerial vehicle and the position of the target takeoff and landing point, the unmanned aerial vehicle to land at the target takeoff and landing point. In this way, steps such as changing a power supply, placing a delivery object, and loading a delivery object are performed at the target takeoff and landing point. The unmanned aerial vehicle landing method provided in this specification is also applied to a scenario in which the unmanned aerial vehicle lands at the target takeoff and landing point. Based on this, the unmanned aerial vehicle may first determine a target takeoff and landing point for landing.

In one or more embodiments provided in this specification, the unmanned aerial vehicle landing method provided in this specification may be executed by an unmanned aerial vehicle. Certainly, a server of a service provider may determine the position of the target takeoff and landing point according to image data collected by the unmanned aerial vehicle, and determine a movement policy of the unmanned aerial vehicle according to the position of the target takeoff and landing point and the position of the unmanned aerial vehicle, so as to control the unmanned aerial vehicle to land. For ease of description, an example in which the unmanned aerial vehicle performs the unmanned aerial vehicle landing method is subsequently used for description.

Specifically, the unmanned aerial vehicle may determine a delivery task that is being executed by the unmanned aerial vehicle; and then, determine a corresponding target takeoff and landing point according to an execution phase of the delivery task. For example, in a pick-up phase, the unmanned aerial vehicle can determine the current target takeoff and landing point as a pick-up position. In the delivery phase, the unmanned aerial vehicle can determine the current target takeoff and landing point as a delivery position. The delivery task in this specification is a task allocated by the service provider to the unmanned aerial vehicle, and may not only include tasks such as express delivery and takeout delivery, but also include a scheduling task and the like. A specific task type included in a delivery task may be set according to a requirement. This is not limited in this specification.

Certainly, the target takeoff and landing point may alternatively be pre-stored in the unmanned aerial vehicle. When determining that the unmanned aerial vehicle needs to land, the unmanned aerial vehicle obtains the target takeoff and landing point pre-stored in the unmanned aerial vehicle, and controls the unmanned aerial vehicle to land toward the target takeoff and landing point.

After the target takeoff and landing point is determined, the unmanned aerial vehicle may determine environment information of the target takeoff and landing point, where the environment information includes a marker corresponding to the target takeoff and landing point and a marker of each takeoff and landing point around the target takeoff and landing point in an unmanned aerial vehicle airport to which the target takeoff and landing point belongs.

The unmanned aerial vehicle may perform target object identification on a ground image according to the collected ground image, and determine a position of a marker of a target takeoff and landing point in the ground image as a position of the target takeoff and landing point in the ground image, and further control, according to the position of the target takeoff and landing point, the unmanned aerial vehicle to land at the target takeoff and landing point.

In addition, because impact of different markers on accurate landing of the unmanned aerial vehicle is not considered in the related technology, the related technology generally includes only one target landing point. The service provider sets a marker of only one takeoff and landing point, so as to ensure that the unmanned aerial vehicle can precisely land according to the marker of the takeoff and landing point. When the unmanned aerial vehicle performs precise landing, the unmanned aerial vehicle needs to collect a ground image, perform target object identification on the ground image, and determine a position of a target object in the image. However, in the related technology, only one takeoff and landing point is set, so that when target object identification is performed in the related technology, an identification error may occur or a takeoff and landing point cannot be identified. However, according to the marker allocation method in an unmanned aerial vehicle airport provided in this specification, an unmanned aerial vehicle airport including multiple takeoff and landing points may be generated for one target landing point. When an unmanned aerial vehicle identifies an unmanned aerial vehicle airport in an image, because the unmanned aerial vehicle airport includes multiple takeoff and landing points, an area occupied by the unmanned aerial vehicle airport in the image is relatively large. Therefore, identification efficiency and a success rate are relatively high, and delivery efficiency of the unmanned aerial vehicle is improved.

Figures 7, 8:
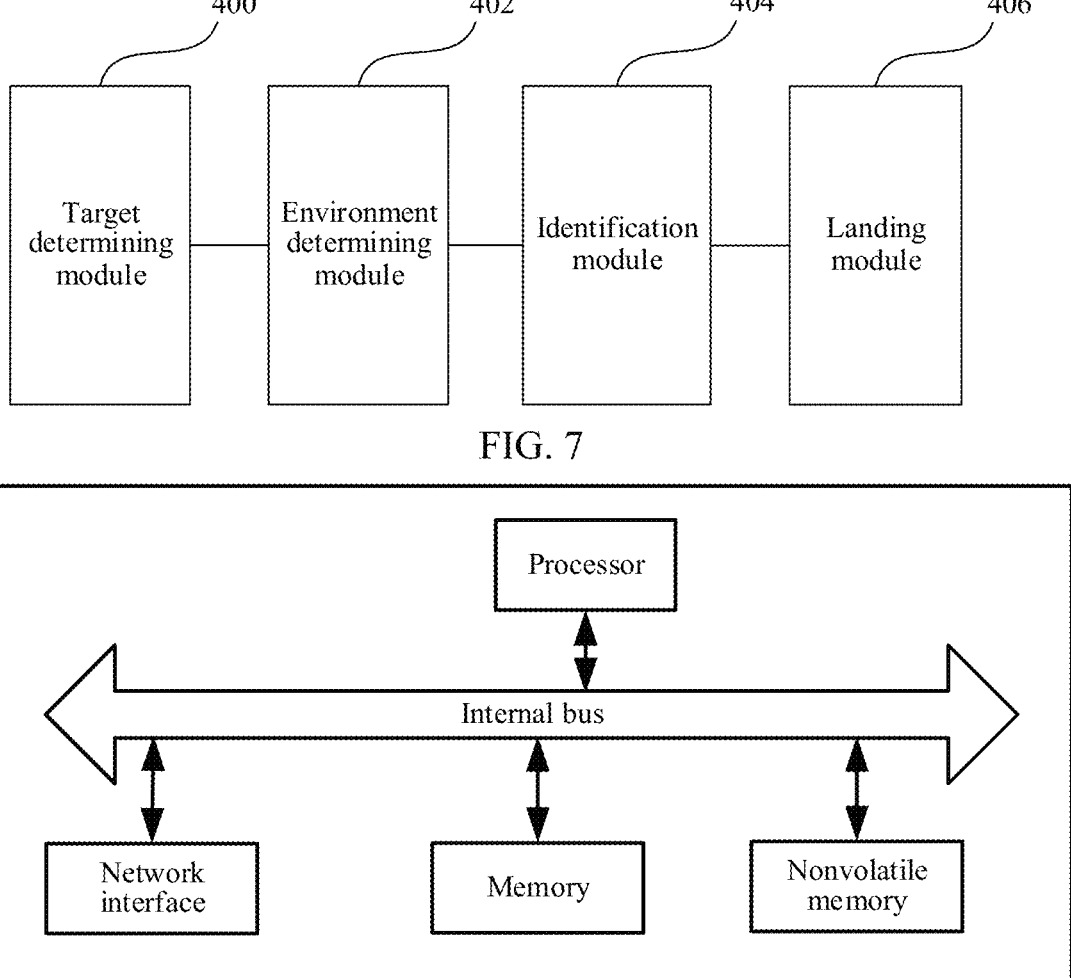
FIG. 7 is a schematic diagram of an unmanned aerial vehicle landing apparatus according to this specification.
FIG. 8 is a schematic diagram of an electronic device corresponding to FIG. 1 or FIG. 5 according to this specification.

The foregoing describes a marker allocation method in an unmanned aerial vehicle airport and an unmanned aerial vehicle landing method according to one or more embodiments of this specification. Based on a same idea, this specification further provides a corresponding marker allocation apparatus in an unmanned aerial vehicle airport and an unmanned aerial vehicle landing apparatus, as shown in FIG. 6 and FIG. 7.

FIG. 6 is a schematic diagram of a marker allocation apparatus in an unmanned aerial vehicle airport according to this specification, including:

a first determining module 300, configured to determine a target layout of an unmanned aerial vehicle airport according to an airport shape and an airport size of the unmanned aerial vehicle airport and a predetermined standard shape and a predetermined standard size of a takeoff and landing point, where the target layout includes multiple takeoff and landing points:

a second determining module 302, configured to determine an initial takeoff and landing point from the multiple takeoff and landing points included in the target layout; and an allocation module 304, configured to: determine markers respectively allocated to the multiple takeoff and landing points from a predetermined marker set by using the initial takeoff and landing point as a start point, according to a predetermined search algorithm, and by using a constraint that similarity between a marker of any one of the multiple takeoff and landing points and markers of other takeoff and landing points in a specified neighborhood thereof is the lowest, where image content of each marker in the marker set is different.

Optionally, the first determining module 300 is configured to: determine multiple takeoff and landing point layouts of the unmanned aerial vehicle airport according to the airport shape and the airport size of the unmanned aerial vehicle airport and the predetermined standard shape and the predetermined standard size of the takeoff and landing point; and determine the target layout of the unmanned aerial vehicle airport from the multiple takeoff and landing point layouts according to a quantity of takeoff and landing points included in the multiple takeoff and landing point layouts.

Optionally, the first determining module 300 is configured to randomly determine a takeoff and landing point as a start point within a range of the unmanned aerial vehicle airport according to the airport shape and the airport size of the unmanned aerial vehicle airport; determine, along a normal direction of any boundary of the start point according to the predetermined standard shape and the predetermined standard size of the takeoff and landing point, a takeoff and landing point that is at a predetermined spacing from the start point in the range of the unmanned aerial vehicle airport, re-use the determined takeoff and landing point as a new start point, continue to determine another takeoff and landing point in another region different from the determined takeoff and landing point in the range of the unmanned aerial vehicle airport until a takeoff and landing point cannot be determined, and determine a takeoff and landing point layout: determine whether a quantity of generated takeoff and landing point layouts is less than a predetermined quantity threshold; and if the quantity of generated takeoff and landing point layouts is less than the predetermined quantity threshold, randomly re-determine a takeoff and landing point in the range of the unmanned aerial vehicle airport, and continue to determine a takeoff and landing point layout until a quantity of determined takeoff and landing point layouts reaches the quantity threshold: or if the quantity of generated takeoff and landing point layouts is greater than or equal to the predetermined quantity threshold, skip continuing to determine a takeoff and landing point layout.

Optionally, the first determining module 300 is configured to: determine, along a normal direction of any boundary of the start point, whether a region that is at the predetermined spacing from the start point and that is distant from other determined takeoff and landing points by not less than the predetermined spacing exists in the range of the airport; and if the region exists, determine the region as a new takeoff and landing point, update the new takeoff and landing point as a new start point, and continue to determine, along a normal direction of any boundary of the new start point, a region used as a takeoff and landing point in the range of the airport: or if the region does not exist, continue to determine a takeoff and landing point along a normal direction of another boundary of the start point, and use a determined takeoff and landing point as a re-determined start point.

Optionally, the first determining module 300 is configured to: when a takeoff and landing point cannot be determined along a normal direction of each boundary of the start point, determine, according to a sequence of determining each start point, a previous start point of the start point as a specified position; and re-determine the specified position as a start point to continue to determine a takeoff and landing point until a takeoff and landing point cannot be determined within the range of the airport.

Optionally, the second determining module 302 is configured to determine, according to positions of the multiple takeoff and landing points in the target layout and from the multiple takeoff and landing points included in the target layout, a takeoff and landing point positioned in a center of the unmanned aerial vehicle airport as the initial takeoff and landing point.

Optionally, the second determining module 302 is configured to: determine a central position of the unmanned aerial vehicle airport according to the airport shape and the airport size: for each takeoff and landing point in the target layout, determine a distance between the takeoff and landing point and the central position of the unmanned aerial vehicle airport; and sort the multiple takeoff and landing points according to determined distances, and determine, according to the sorting, a takeoff and landing point positioned in the center of the unmanned aerial vehicle airport from the multiple takeoff and landing points.

Optionally, the allocation module 304 is configured to determine a marker corresponding to the initial takeoff and landing point from the predetermined marker set; determine any takeoff and landing point to which no marker is allocated and adjacent to the initial takeoff and landing point: determine a marker allocated to the adjacent takeoff and landing point from the marker set by using similarity between the marker of the adjacent takeoff and landing point and markers of other takeoff and landing points in a specified neighborhood thereof being lowest as a constraint; and re-use the adjacent takeoff and landing point as the initial takeoff and landing point, and continue to allocate a marker to a takeoff and landing point to which no marker is allocated until markers are allocated to the multiple takeoff and landing points.

Optionally, the allocation module 304 is configured to search for the multiple takeoff and landing points in the target layout according to the predetermined search algorithm by using the initial takeoff and landing point as a start point, and determine a search sequence that traverses the multiple takeoff and landing points; and determine, for each found takeoff and landing point according to the search sequence, a marker allocated to the takeoff and landing point from the predetermined marker set by using a constraint that similarity between a marker of the takeoff and landing point and markers of other takeoff and landing points in a specified neighborhood of the takeoff and landing point is the lowest.

Optionally, the allocation module 304 is configured to allocate a marker to each of the multiple takeoff and landing points according to the search sequence of the multiple takeoff and landing points and a sequence of markers in the predetermined marker set: when all markers in the marker set are allocated, determine whether a takeoff and landing point to which no marker is allocated exists in the multiple takeoff and landing points of the target layout; and if a takeoff and landing point to which no marker is allocated exists in the multiple takeoff and landing points in the target layout, determine, for each takeoff and landing point to which no marker is allocated, a distance between each takeoff and landing point to which a marker is allocated and the takeoff and landing point, as a distance between a marker corresponding to each takeoff and landing point to which a marker is allocated and the takeoff and landing point, and allocate a marker to the takeoff and landing point according to the distance between a marker corresponding to each takeoff and landing point to which a marker is allocated and the takeoff and landing point.

FIG. 7 is a schematic diagram of an unmanned aerial vehicle landing apparatus according to this specification, including:

a target determining module 400, configured to determine, according to task information of a task allocated to an unmanned aerial vehicle, a target takeoff and landing point corresponding to the task:

an environment determining module 402, configured to determine environment information of the target takeoff and landing point, where the environment information includes a marker corresponding to the target takeoff and landing point and a marker of each takeoff and landing point around the target takeoff and landing point in an unmanned aerial vehicle airport to which the target takeoff and landing point belongs:

an identification module 406, configured to: perform, according to a collected ground image, target object identification on the ground image, and determine a position of the marker of the target takeoff and landing point in the ground image as a position of the target takeoff and landing point in the ground image; and a landing module 408, configured to control the unmanned aerial vehicle to land at the target takeoff and landing point according to the position of the target takeoff and landing point.

This specification further provides a computer readable storage medium, where the storage medium stores a computer program, and the computer program may be configured to execute any one of the foregoing marker allocation method in an unmanned aerial vehicle airport provided in FIG. 1 and the foregoing unmanned aerial vehicle landing method provided in FIG. 4.

This specification further provides a schematic structural diagram of an electronic device shown in FIG. 8. As shown in FIG. 8, at a hardware level, the electronic device includes a processor, an internal bus, a network interface, a memory, and a non-volatile memory, and certainly may further include hardware required by another service. The processor reads a corresponding computer program from the non-volatile memory, and then runs the computer program in the memory, so as to implement any one of the foregoing marker allocation method in an unmanned aerial vehicle airport provided in FIG. 1 and the foregoing unmanned aerial vehicle landing method provided in FIG. 5. Certainly, in addition to a software implementation, one or more embodiments of this specification do not exclude other implementations, for example, logic devices or a software-hardware combination. That is, execution bodies of the following processing procedures are not limited to logic units and may alternatively be hardware or logic devices.

In the 1990s, improvements in a technology can be clearly categorized as hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler" software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lavam Lola.

MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller may be implemented in any suitable manner, for example, the controller may take the form of, for example, a microprocessor or processor, and a computer readable medium, a logic gate, a switch, an application specific integrated circuit (ASIC), a programmable logic controller, and an embedded microcontroller storing computer readable program code (for example, software or firmware) executable by the (micro) processor. Examples of the controller include but are not limited to the following microcontrollers: ARC 625D. Atmel AT91SAM. Microchip PIC18F26K20, and Silicone Labs C8051F320. The memory controller may further be implemented as part of a control logic of the memory. A person skilled in the art will also appreciate that, in addition to implementing, by logically programming the method steps, the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be specifically implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of the devices.

For ease of description, when the apparatus is described, the apparatus is divided into units according to functions, which are separately described. Certainly, in implementation of this specification, the functions of the units may be implemented in the same piece of or multiple pieces of software and/or hardware.

A person skilled in the art should understand that the embodiments of the present invention may be provided as a method, a system, or a computer program product. Therefore, the present invention may use a form of hardware-only embodiments, software-only embodiments, or embodiments with a combination of software and hardware. Moreover, the present invention may use a form of a computer program product that is implemented on one or more computer-usable storage media (including but not limited to a disk memory, a compact disc read-only memory (CD-ROM), an optical memory, and the like) that include computer-usable program code.

The present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (such as CPUs), an input/output interface, a network interface, and a memory.

The memory may include a form such as a volatile memory, a random access memory (RAM), and/or a non-volatile memory such as a read-only memory (ROM) or a flash memory (flash RAM) in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage device, or any other non-transmission medium, which may be configured to store information accessible by a computing device. According to definitions of this specification, the computer-readable medium does not include transitory computer-readable media, such as a modulated data signal and a modulated carrier.

It should be further noted that, the term "include," "comprise," or their any other variants is intended to cover a non-exclusive inclusion, so that a process, a method, a product, or a device that includes a series of elements not only includes such elements, but also includes other elements not expressly listed, or further includes elements inherent to such a process, method, product, or device. Unless otherwise specified, an element limited by "include a/an . . . " does not exclude other same elements existing in the process, the method, the article, or the device that includes the element.

A person skilled in the art should understand that the embodiments of this specification may be provided as a method, a system, or a computer program product. Therefore, this specification may use a form of hardware-only embodiments, software-only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

This specification can be described in the general context of computer-executable instructions executed by a computer, for example, program modules. Generally, the program module includes a routine, a program, an object, a component, a data structure, and the like for executing a particular task or implementing a particular abstract data type. This specification may also be implemented in a distributed computing environment in which tasks are performed by remote processing devices connected by using a communication network. In a distributed computing environment, the program module may be positioned in both local and remote computer storage media including storage devices.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly: for related parts, reference may be made to partial descriptions in the method embodiment.

The invention claimed is:

1. A marker allocation method in an unmanned aerial vehicle airport, comprising:

when an unmanned aerial vehicle performs visual-guided landing, determining a target layout of the unmanned aerial vehicle airport according to an airport shape and an airport size of the unmanned aerial vehicle airport in a field of view of an image collection device of the unmanned aerial vehicle, and a predetermined standard shape and a predetermined standard size of a takeoff and landing point, wherein the target layout comprises multiple takeoff and landing points;

determining an initial takeoff and landing point from the multiple takeoff and landing points comprised in the target layout; and determining markers respectively allocated to the multiple takeoff and landing points from a predetermined marker set by using the initial takeoff and landing point as a start point, according to a predetermined search algorithm, and with a constraint that similarity between a marker of any one of the multiple takeoff and landing points and markers of other takeoff and landing points of the multiple takeoff and landing points in a specified neighborhood thereof is the lowest, wherein image content of each marker in the marker set is different, wherein the unmanned aerial vehicle lands according to the markers respectively allocated to the multiple takeoff and landing points, and wherein determining markers respectively allocated to the multiple takeoff and landing points from the predetermined marker set by using the initial takeoff and landing point as the start point, according to the predetermined search algorithm, and with the constraint that similarity between a marker of any one of the multiple takeoff and landing points and markers of other takeoff and landing points of the multiple takeoff and landing points in the specified neighborhood thereof is the lowest comprises:

searching for the multiple takeoff and landing points in the target layout according to the predetermined search algorithm by using the initial takeoff and landing point as the start point, and determining a search sequence that traverses the multiple takeoff and landing points; and determining, for each found takeoff and landing point according to the search sequence, a marker allocated to the found takeoff and landing point from the predetermined marker set with the constraint that similarity between a marker of the found takeoff and landing point and markers of other takeoff and landing points of the multiple takeoff and landing points in the specified neighborhood of the found takeoff and landing point is the lowest.

2. The method according to claim 1, wherein determining the target layout of the unmanned aerial vehicle airport according to the airport shape and the airport size of the unmanned aerial vehicle airport and the predetermined standard shape and the predetermined standard size of the takeoff and landing point comprises:

determining multiple takeoff and landing point layouts of the unmanned aerial vehicle airport according to the airport shape and the airport size of the unmanned aerial vehicle airport and the predetermined standard shape and the predetermined standard size of the takeoff and landing point; and determining the target layout of the unmanned aerial vehicle airport from the multiple takeoff and landing point layouts according to a quantity of takeoff and landing points comprised in the multiple takeoff and landing point layouts.

3. The method according to claim 1, wherein determining the initial takeoff and landing point from the multiple takeoff and landing points comprised in the target layout comprises:

determining, according to positions of the multiple takeoff and landing points in the target layout and from the multiple takeoff and landing points comprised in the target layout, the takeoff and landing point positioned in a center of the unmanned aerial vehicle airport as the initial takeoff and landing point.

4. The method according to claim 3, wherein determining, according to positions of the multiple takeoff and landing points in the target layout, the takeoff and landing point positioned in the center of the unmanned aerial vehicle airport comprises:

determining a central position of the unmanned aerial vehicle airport according to the airport shape and the airport size;

for each takeoff and landing point in the target layout, determining a distance between the takeoff and landing point and the central position of the unmanned aerial vehicle airport; and sorting the multiple takeoff and landing points according to determined distances, and determining, according to the sorting, the takeoff and landing point positioned in the center of the unmanned aerial vehicle airport from the multiple takeoff and landing points.

5. The method according to claim 1, wherein determining markers respectively allocated to the multiple takeoff and landing points from the predetermined marker set by using the initial takeoff and landing point as the start point, according to the predetermined search algorithm, and with the constraint that similarity between a marker of any one of the multiple takeoff and landing points and markers of other takeoff and landing points of the multiple takeoff and landing points in the specified neighborhood thereof is the lowest comprises:

determining a marker corresponding to the initial takeoff and landing point from the predetermined marker set;

determining an adjacent takeoff and landing point of the multiple takeoff and landing points to which no marker is allocated and adjacent to the initial takeoff and landing point;

determining a marker allocated to the adjacent takeoff and landing point from the marker set by using similarity between the marker of the adjacent takeoff and landing point and markers of other takeoff and landing points of the multiple takeoff and landing points in the specified neighborhood thereof being lowest as the constraint; and re-using the adjacent takeoff and landing point as the initial takeoff and landing point, and continuing to allocate a marker to another takeoff and landing point of the multiple takeoff and landing points to which no marker is allocated until the markers are allocated to the multiple takeoff and landing points.

6. A non-transitory computer readable storage medium, wherein the storage medium stores a computer program, and the computer program is executed by a processor to implement operations comprising:

when an unmanned aerial vehicle performs visual-guided landing, determining a target layout of the unmanned aerial vehicle airport according to an airport shape and an airport size of the unmanned aerial vehicle airport in a field of view of an image collection device of the unmanned aerial vehicle, and a predetermined standard shape and a predetermined standard size of a takeoff and landing point, wherein the target layout comprises multiple takeoff and landing points;

determining an initial takeoff and landing point from the multiple takeoff and landing points comprised in the target layout; and determining markers respectively allocated to the multiple takeoff and landing points from a predetermined marker set by using the initial takeoff and landing point as a start point, according to a predetermined search algorithm, and with a constraint that similarity between a marker of any one of the multiple takeoff and landing points and markers of other takeoff and landing points of the multiple takeoff and landing points in a specified neighborhood thereof is the lowest, wherein image content of each marker in the marker set is different, wherein the unmanned aerial vehicle lands according to the markers respectively allocated to the multiple take-off and landing points, and wherein determining markers respectively allocated to the multiple takeoff and landing points from the predetermined marker set by using the initial takeoff and landing point as the start point, according to the predetermined search algorithm, and with the constraint that similarity between a marker of any one of the multiple takeoff and landing points and markers of other takeoff and landing points of the multiple takeoff and landing points in the specified neighborhood thereof is the lowest comprises:

searching for the multiple takeoff and landing points in the target layout according to the predetermined search algorithm by using the initial takeoff and landing point as the start point, and determining a search sequence that traverses the multiple takeoff and landing points; and determining, for each found takeoff and landing point according to the search sequence, a marker allocated to the found takeoff and landing point from the predetermined marker set with the constraint that similarity between a marker of the found takeoff and landing point and markers of other takeoff and landing points of the multiple takeoff and landing points in the specified neighborhood of the found takeoff and landing point is the lowest.

\* \* \* \* \*